April 24, 1934.  C. W. COLLINS  1,956,315
BRAKE
Filed Feb. 4, 1929
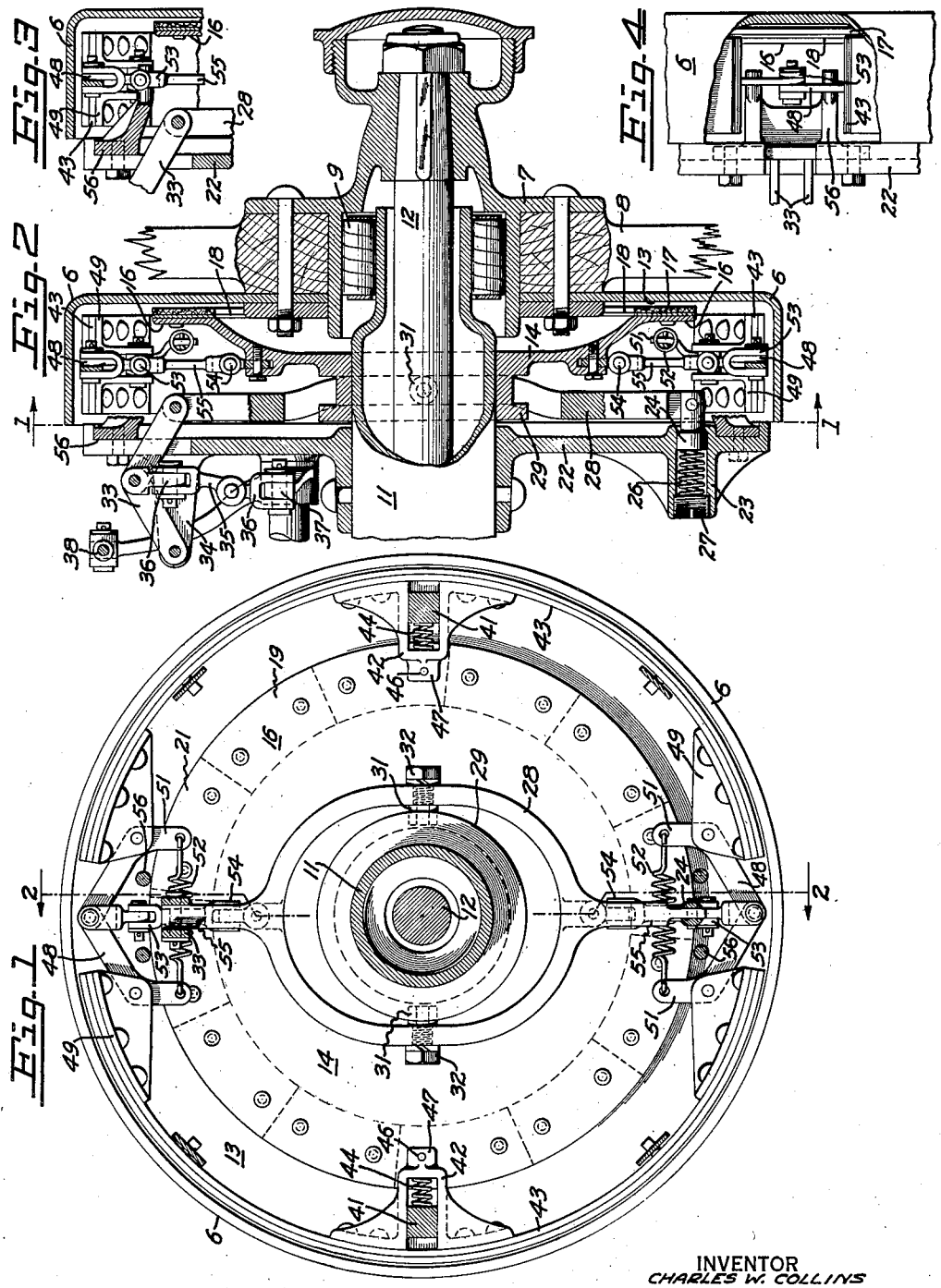
INVENTOR
CHARLES W. COLLINS
BY Charles S. Evans
HIS ATTORNEY Patented Apr. 24, 1934

1,956,315

UNITED STATES PATENT OFFICE 1,956,315

BRAKE

Charles W. Collins, Seattle, Wash.

Application February 4, 1929, Serial No. 337,263

7 Claims. (Cl. 188—140)

My invention relates to brakes for retarding the relative movement between two objects, and it is particularly adapted to vehicle brakes.

An object of my invention is to provide a brake in which braking effort is derived from the movement which it is desired to retard.

Another object of my invention is to provide a brake which will not "grab" or lock.

Still another object of my invention is to provide a brake in which the braking force is proportional to the movement to be retarded.

A further object of my invention is to provide a vehicle brake which will not cause skidding or sliding of the wheels.

My invention possesses other objects and valuable features, some of which will be set forth in the following description of my invention which is illustrated in the drawing forming part of the specification. It is to be understood that I do not limit myself to the showing made by the said description and drawing, as I may adopt varying forms of my invention within the scope of the claims.

Referring to the drawing:

Figure 1 is a vertical sectional view of an automobile brake embodying my invention, the plane of section being parallel to the plane of the vehicle wheel and on the line 1—1 of Fig. 2.

Figure 2 is a vertical sectional view of the brake shown in Fig. 1, the line of section being shown by the line 2—2 of Fig. 1.

Figure 3 is a fragmentary sectional view taken in the same plane as Fig. 2, and showing a portion of the mechanism which, for clearness, is cut away in the latter figure.

Figure 4 is a plan view, partly in section, of the same portion of the mechanism as is shown in Fig. 3.

Broadly stated, my invention comprises a clutch member engageable with an object which is movable relative thereto. Means are provided for effecting the engagement of the clutch member, and the tendency of the latter to move with the object actuates a brake mechanism which further engages the object to retard the relative movement. Since it is this movement which actuates the brake, the retarding force is proportional to the speed, and in the case of a vehicle brake, any tendency of the wheels to lock and slide is self-correcting. Preferably there is also provided means for limiting the degree of engagement of the clutch, thus preventing "grabbing" of the brake and making its operation exceptionally smooth as well as highly effective.

In more detailed terms, a preferred embodiment of my invention as applied to a motor vehicle comprises a drum 6, which is secured to the hub 7 of a vehicle wheel 8. The wheel is shown as being mounted on roller bearings 9 which run on the axle housing 11 in the usual manner, the drive for the wheel being provided by the live axle 12. The drum differs from the usual brake drum only in having its flat or disk surface 13 smoothly finished to form a clutch surface. Slidably and oscillatably mounted upon the axle housing is a clutch member or disk 14. The disk is dished to clear the wheel hub and has at its periphery a flat flange 16 which is faced with a friction material 17. It is convenient to mount this friction material upon a thin metal ring 18 which is divided into two halves to permit its ready replacement. The friction material is preferably made up of alternate sectors of hard brake lining 19 and solid graphite 21, as this forms a friction surface which will engage smoothly and easily and will disengage instantly.

Mounted on the axle housing, closely adjacent the open face of the drum is a fixed disk 22 for carrying the actuating mechanism of the device. Adjacent one edge of this disk is a hollow boss 23 within which is slidably mounted the plunger 24. A spring 26 behind the plunger, adjustable by means of the screw-cap 27, presses the plunger outwardly, its end extending through an opening in the disk and into the brake drum. Pivotally mounted to the end of the plunger is a yoke lever 28 which straddles a collar 29 carried by the clutch disk. Rollers 31 are secured by screws 32 to the yoke and engage the collar so that movement of the lever will engage or disengage the clutch.

The upper end of the lever is pivotally attached to one end of a toggle 33. The other end is supported by a bracket 34 extending inwardly from the disk 22, the disk being apertured to allow the toggle to work through it. The toggle is actuated by a link 35, connected by universal joints 36 to the center of the toggle and to a bell crank 37. This bell crank is operated by a brake rod 38 connecting to the usual foot pedal or hand lever of the vehicle.

Extending outwardly and into the brake drum from the disk 22 are two brackets 41 having squared ends. Yokes 42 slide over the ends and are secured to brake shoes 43. A spring 44 is interposed between the end of the bracket and the yoke and serves to draw the brake shoe away from the drum when the brake is not in use. The springs 44 are held in place by a pin 46 extending through a boss 47 on the end of the yoke which receives the springs. The two brake shoes are connected by a toggle 48 at each end of each shoe, the toggle being pivotally attached to the shoe by means of flange fittings 49. Each of the toggle arms carries an extension 51 which is eyed to receive a tension spring 52. The spring tends to draw the extension arms 51 together, flexing the toggle and further tending to hold the brake shoe away from the drum.

Connected by universal joints 53 and 54 with the clutch disk 14 and the toggle 48, respectively, is a link 55. A forked or U-shaped bracket 56 is secured to the disk astride the link, its end serving as a stop which prevents the toggle from carrying past center.

When it is desired to use the brake, the pedal or lever is operated in the usual manner, which straightens out the toggle 33 and forces the clutch disk 14 against the clutch surface 13. This tends to rotate the clutch disk, producing a drag on the link 55 which tends to straighten the toggle 48 and thus operate the brake. The braking effort so applied is dependent both upon the force with which it is engaged and upon the relative velocity of the clutch disk and the brake drum, the effort being greater as the speed of the vehicle is greater. Relatively little actual braking effort is supplied by the clutch disk, its surface being such that it will not grab and cling to the brake drum but will engage it slidably and thus supply ample brake force.

If it be endeavored to apply too much force in engaging the clutch, the spring 26 will yield, thus limiting the degree of engagement of the clutch.

It will be seen that if the wheel tends to lock, relative movement between the brake drum and clutch disk ceases, thereby releasing the brake. This prevents sliding of the vehicle wheels and insures optimum braking conditions.

I claim:

1. In a brake, a movably mounted clutch element adapted to engage a drum, means for moving the clutch element into engagement with the drum, means actuated by said clutch for further engaging the drum, and means arranged within the drum for limiting the degree of engagement of the clutch.

2. In a brake, a movably mounted clutch element adapted to engage a drum, means for moving the clutch element into engagement with the drum, means actuated from said clutch by relative movement of the drum for further engaging the drum, and means arranged within the drum for limiting the degree of engagement of the clutch.

3. A brake comprising a drum, a clutch surface formed within the drum, a clutch member slidably mounted within the drum for engaging the clutch surface, means for moving the clutch member into engagement with the clutch surface, a pair of brake shoes within the drum, a toggle connecting the shoes, a link pivotally connecting the toggle and the clutch member, and means for tensioning the link to actuate the brake upon engagement of the clutch, and means for limiting the degree of engagement of the clutch.

4. In a brake, a rotatably mounted drum, a brake shoe fixed against rotation and engageable with the drum, a clutch surface on the drum, a clutch member mounted for oscillatory movement and engageable with the clutch surface, a lever mounted within the drum for engaging the clutch member with the clutch surface, resilient means connected with said lever for limiting the degree of engagement of said member and surface, and means actuated by oscillation of the clutch member for effecting the engagement of the shoe and the drum.

5. In a brake, a rotatably mounted drum, a brake shoe fixed against rotation and engageable with the drum, a clutch surface on the drum, a clutch member mounted for oscillatory movement and engageable with the clutch surface, a lever for engaging the clutch member with the clutch surface, a resiliently mounted fulcrum for said lever, and means actuated by oscillation of the clutch member for effecting the engagement of the shoe and the drum.

6. A brake comprising a drum, a backing plate, a clutch mounted within the drum and adapted for engagement therewith, brake means engagable with the drum and actuated by said clutch, a shift lever pivotally mounted on the backing plate and positioned within the drum for moving the clutch, a toggle connected between the backing plate and the shift lever, a control lever mounted on the backing plate, and a link pivotally connecting the toggle and said lever.

7. A brake comprising a drum, an apertured backing plate, a clutch mounted within the drum and adapted for engagement therewith, brake means engagable with the drum and actuated by said clutch, a shift lever pivotally mounted on the backing plate and positioned within the drum for moving the clutch, a toggle mounted on the backing plate adjacent the exterior side thereof, one link of the toggle passing through the aperture in the backing plate and connecting with said shift lever, a control lever mounted on the backing plate, and a link pivotally connecting the toggle and said lever.

CHARLES W. COLLINS.